United States Patent [19]
Behrens et al.

[11] Patent Number: 5,490,873
[45] Date of Patent: Feb. 13, 1996

[54] HYDROCARBON EMISSION REDUCTION

[75] Inventors: Steven D. Behrens, College Station; Jerry A. Bullin, Bryan, both of Tex.

[73] Assignee: Bryan Research & Engineering, Inc., Bryan, Tex.

[21] Appl. No.: 304,232

[22] Filed: Sep. 12, 1994

[51] Int. Cl.[6] .............................. B01D 47/06; B01D 19/00
[52] U.S. Cl. ................................ 95/160; 95/163; 95/164; 95/166; 95/169; 95/174; 95/177; 95/179; 95/192; 95/231
[58] Field of Search .............................. 95/156, 159–161, 95/163–166, 169, 172–177, 179, 180, 186–188, 191, 192, 204, 231, 258, 259, 263, 266

[56] References Cited

U.S. PATENT DOCUMENTS

| | | | |
|---|---|---|---|
| 2,235,322 | 3/1941 | Martin | 95/192 |
| 3,105,748 | 10/1963 | Stahl | 55/32 |
| 3,349,544 | 10/1967 | Arnold et al. | 55/32 |
| 3,855,337 | 12/1974 | Foral, Jr. et al. | 95/191 |
| 4,050,909 | 9/1977 | Ranke | 95/161 |
| 4,273,620 | 6/1981 | Knobel | 95/191 X |
| 4,498,911 | 2/1985 | Deal et al. | 95/231 X |
| 4,529,413 | 7/1985 | Ferguson | 95/166 |
| 4,548,620 | 10/1985 | Albiol | 95/174 |
| 4,708,721 | 11/1987 | Ehrler | 95/180 |
| 5,209,762 | 5/1993 | Lowell | 95/192 |
| 5,346,537 | 9/1994 | Lowell | 95/231 X |

FOREIGN PATENT DOCUMENTS

| | | | |
|---|---|---|---|
| 3840238 | 5/1990 | Germany | 95/156 |
| WO94/11090 | 5/1994 | WIPO | 95/159 |

OTHER PUBLICATIONS

Publication Entitled "Drizo–Improved Regeneration OF Glycol Solutions" By R. L. Pearce, J. E. Protz, and G. W. Lyon; The Dow Chemical Company, Midland Michigan published prior to 1985.

Publication Entitled "Super–Dehydration With Glycols" By Steve Worley, Black, Sivalls, Bryson, Incorporated, Oklahoma City, OK published 1967.

Publication Entitled "The Texaco/Coastal Emission Control Process" by William Manning and Don Ballard; Coastal Chemical Company, Inc. on or before Mar. 1993.

Publication Entitled "The R–BTEX Process™ For Mitigating Air Emissions From Glycol Dehydrators" by C. Richard Sivalls; Sivalls, Inc. Curtis O. Rueter and Kevin S. Fisher; Radian Corporation and Jorge P. Gamez; Gas Research Institute on or before Mar. 1993.

*Primary Examiner*—Robert Spitzer
*Attorney, Agent, or Firm*—Bush, Moseley, Riddle & Jackson

[57] ABSTRACT

An improved process for the glycol dehydration of water-containing natural gas comprises contacting the natural gas and glycol in a contacting zone to produce a dried natural gas and a water-rich glycol, and heating the water-rich glycol in a regeneration zone to produce a water-lean glycol for reintroduction into the contacting zone and a water-containing gaseous overhead. The gaseous overhead is partially condensed and the resulting gaseous components are returned to the contacting zone. In a preferred embodiment, the glycol is further purified by contact in a separate stripping column with dry stripping gas under a pressure lower than that of the regeneration zone.

5 Claims, 1 Drawing Sheet

HYDROCARBON EMISSION REDUCTION

BACKGROUND OF THE INVENTION

This invention relates to an improved method for the glycol dehydration of gas streams. More particularly, the invention relates to an improved method for the glycol dehydration of natural gas streams wherein the emission of hydrocarbons or derivatives thereof to the environment is at least substantially reduced.

FIELD OF THE INVENTION

Natural gas is typically obtained from the well as a complex mixture of organic and inorganic materials. The gas is conventionally treated, if necessary, to render it free from the acidic inorganic compounds such as hydrogen sulfide and carbon dioxide. The remaining gas stream predominantly comprises methane with lesser amounts of low-boiling aliphatic hydrocarbons such as ethane and propane, as well as small amounts of higher-boiling aromatic hydrocarbons such as benzene, toluene or xylene. Also typically present is water. This presence of water is detrimental during the storage and transmission of the gas because of the undesirable condensation or even freezing of the water which often takes place. Accordingly, a gas stream of natural gas origin, after removal of the acid gases, is conventionally dried or "dehydrated" to remove the water present. Many if not most of the dehydration methods involve the use of a glycol such as diethylene glycol or triethylene glycol to selectively remove water from the gas with subsequent regeneration of the glycol for use in dehydration of additional gas. The economics of the drying process depend to a considerable extent upon the efficiency of water removal and glycol regenerations.

In one standard dehydration/regeneration process historically employed, the gas stream is contacted with water-lean glycol to effect dehydration. The resulting water-rich glycol is then heated to a temperature near the glycol decomposition temperature to drive off water and the resulting lean glycol is recirculated to contact and dehydrate additional gas stream. There are practical limits, however, to removal of water from glycol by heating. While the use of relatively high temperatures results in the removal of more water, use of excessively high temperatures results in glycol decomposition. In the case where the glycol being utilized is triethylene glycol, glycol purities of about 98.7% by weight are about the maximum that can be obtained by heating. In processes of this type, most of the aromatic hydrocarbon present in the gas stream, as well as much of the aliphatic hydrocarbon, is vented to the atmosphere from the zone where water and glycol are separated.

An improvement over this historical method is illustrated by Stahl, U.S. Pat. No. 3,105,748. In the Stahl process the glycol, after being heated to remove water, is stripped with dry gas which may be a portion of the natural gas stream which has been dehydrated. By the Stahl process, purities of the glycol to be recirculated may be 99% by weight or even somewhat higher. In the Stahl process as described in U.S. Pat. No. 3,105,748, hydrocarbon gas and water are also emitted into the atmosphere as overhead from the zone wherein water and glycol are separated.

In a variation of the above-described processes, a vacuum is maintained during the heating of the rich glycol to remove water. Use of a relatively low pressure allows reduction of the rich glycol boiling temperature and allows greater water removal without substantial glycol decomposition. Glycol purities of about 99.9% by weight can be achieved. However, practical considerations impose a lower limit upon the pressure to be utilized in the water/glycol separation zone. Use of too low a pressure results in glycol vaporization and loss which makes the process economically unattractive. In this variation of the process, hydrocarbon vapor is also lost to the atmosphere.

In a somewhat different type of process illustrated by Arnold et al., U.S. Pat. No. 3,349,544, an azeotroping agent is employed to aid in the removal of water from the glycol. Depending upon the method of calculation, a purity of glycol to be recirculated of about 99.9% by weight is obtained. In the Arnold et al. process, also termed the DRIZO® Process, hydrocarbon vapor is discharged from the system.

Process emissions of hydrocarbons or combustion derivatives thereof have historically been allowed but more recently have become unacceptable. Environmental concerns and state and federal regulations no longer permit or at least significantly limit such discharges. It would be advantageous to provide a process tier the glycol drying of gas streams of natural gas origin wherein the emission of gaseous hydrocarbons from the process system to the environment is greatly reduced or even eliminated.

SUMMARY OF THE INVENTION

The present invention provides an improved process for the glycol dehydration of natural gas characterized by substantial reduction or elimination of hydrocarbon emissions into the environment. The process comprises contacting, in a contacting zone, a water-containing natural gas stream with glycol, e.g., diethylene glycol or triethylene glycol, to produce a water-rich glycol stream and a dried gaseous product. The rich glycol is heated in a glycol regeneration zone to a temperature below the glycol decomposition temperature to produce (1) a water-lean glycol for use in contacting additional natural gas in the contacting zone and (2) a gaseous, water-containing mixture also containing hydrocarbon. Partial condensation of this gaseous mixture provides liquid hydrocarbon, aqueous waste and a gaseous portion which is reintroduced into the contacting zone for contacting, along with additional natural gas feed, with glycol.

In a preferred embodiment, the water content of the lean glycol produced in the regeneration zone is further reduced by stripping with gas at a temperature and a pressure lower than that of the regeneration zone. The stripping gas is a portion of the dried gas produced in contacting zone. The aqueous gaseous mixture produced by contact of stripping gas and lean glycol is then returned to the regeneration zone and the lean glycol of reduced water content is reintroduced into the contacting zone.

Figure 1:
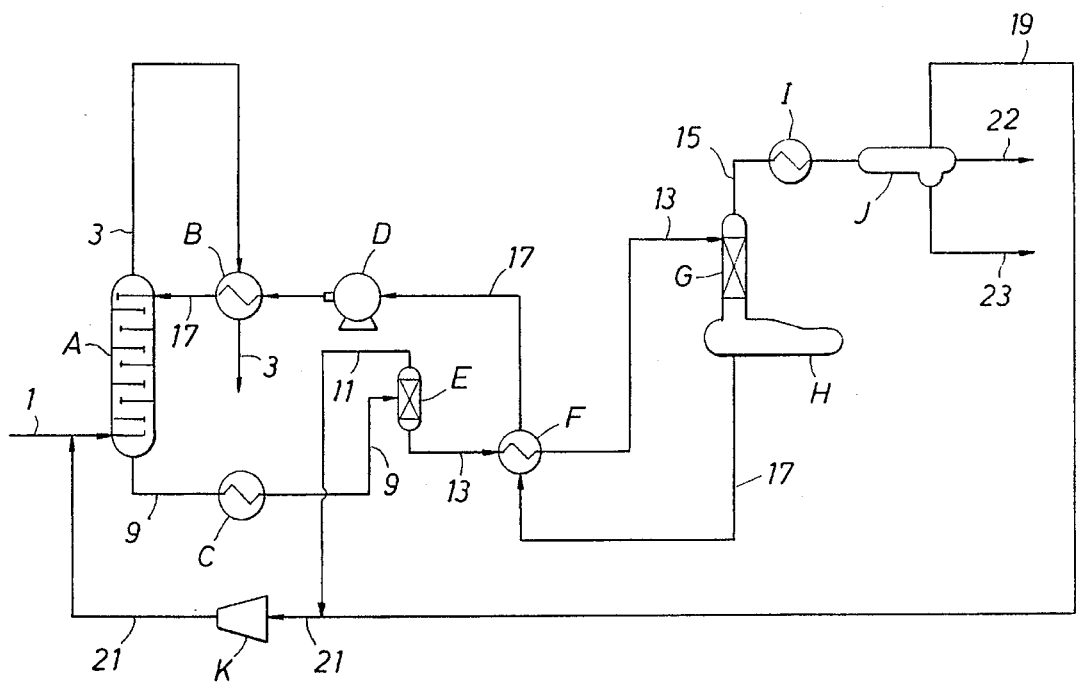
FIG. 1 illustrates a broad aspect of the present invention in which a water-containing gas stream of natural gas origin is contacted with glycol to alehydrate the gas, which is then withdrawn from the process system. The water-rich glycol is passed to a glycol regeneration zone where elevated temperatures are used to drive off water and regenerate relatively lean glycol which is recirculated to contact additional gas stream. The overhead from the regeneration zone is separated and the gaseous portion of the separation products is combined with the feed gas undergoing dehydration.
Figure 2:
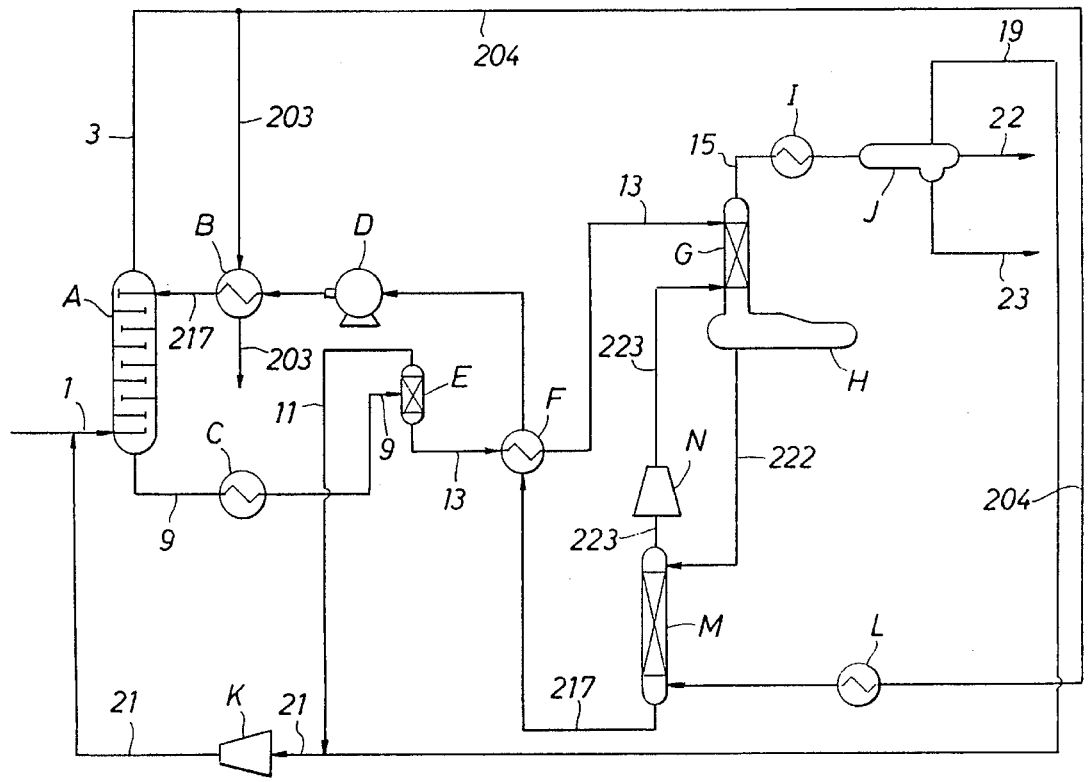
FIG. 2 represents a preferred embodiment of the invention, conducted in general accordance with the process depicted in FIG. 1. However, in this embodiment the relatively lean glycol, after separation from the majority of the water of the rich glycol in the regeneration zone, is additionally dried by stripping with a portion of initially dried gas under reduced pressure in a separate stripping zone. The lean glycol of enhanced purity is returned to the contacting zone to alehydrate additional gas. The stripping gas, water and some organic material is passed to the regeneration zone where the initial water/glycol separation takes place.

It should be noted that in the processes depicted in FIG. 1 and FIG. 2, no emission of gas to the environment takes place.

DESCRIPTION OF THE INVENTION

The present invention provides an improved process for the drying of a water-containing natural gas stream with glycol. By the term "natural gas stream" is meant a stream of gas of natural origin which has been treated, if necessary, to reduce or eliminate harmful inorganic compounds other than water. The natural gas employed as feed to the process of the present invention predominantly comprises methane but will also include other low-boiling aliphatic hydrocarbons such as ethane, propane and butane. Also present are higher-boiling aromatic hydrocarbons such as benzene, toluene, xylene, and water. By the term "glycol" is meant diethylene glycol or triethylene glycol which are conventionally employed in gas dehydration. Of these, triethylene glycol is preferred. The process of the present invention is characterized by the reduction or elimination of hydrocarbon emissions to the environment and by enhancement of the purity and thus the dehydration efficiency of the glycol being recirculated in the process.

In the process of the invention, a water-containing natural gas stream is introduced into the lower portion of a contacting zone which is typically but not necessarily a vertical column with internal means to promote intimate contacting of the gas stream and water-lean glycol introduced into the upper portion of the contacting zone. The means to promote contacting include a plurality of trays or a packing of inert materials. The contacting zone is operated at a temperature of from about 20° F. to about 200° F. and a pressure of from about 50 psia to about 2000 psia. Counter-current contacting of the gas stream and lean glycol in the contacting zone serves to produce a alehydrated or dried gas as overhead product and, in the broadest aspects of the process of the invention, the dried gas is withdrawn for sale, storage or transmission. The water-rich glycol is recovered as bottoms product of the contacting zone and is then treated to remove the water and enable return of tile water-depleted glycol to the contacting zone for use with additional natural gas.

The glycol is regenerated in one or more operations. In the broadest aspects of the invention, the water-rich glycol is passed to a glycol regeneration zone which includes reflux and reboiling. In the regeneration zone, typically a column containing packing or other means to promote liquid/vapor contacting, the rich glycol is heated to a temperature of from about 200° F. to about 450° F. and a pressure of from about 0 psia to about 20 psia. A preliminary separation of water and glycol is accomplished, if desired, in an optional flashing zone, often a flash tank, located intermediate between the contacting zone and the regeneration zone. This flashing zone, if employed, operates at a temperature of from about 20° F. to about 200° F. and a pressure of from about 14 psia to about 2000 psia. The water-depleted glycol bottom products is then returned to the contacting zone. The regeneration zone provides a gaseous overhead product comprising water, methane and portions of the other organic components of the natural gas feed. This overhead product is partially condensed in a separation zone at a temperature of from about 20° F. to about 220° F. and a pressure near or at atmospheric. In the separation zone, by conventional techniques, liquid aqueous products are separated and disposed of by typical waste water means. The higher-boiling organic components are also separated as liquid and are withdrawn for sale, separation or storage. The gaseous product of the separation zone is reintroduced into the contacting zone, separately from or in combination with the natural gas feed.

In a preferred embodiment of the invention, the glycol-containing bottoms product of the regeneration zone is further dried before reintroduction into the contacting zone. This further drying is effected by stripping of the relatively lean glycol in a stripping zone. A quantity of stripping gas up to about 10 scf of gas per gallon of lean glycol is satisfactory. Quantities of stripping gas from about 1 scf/gal to about 3 scf/gal are preferred with an inert gas which in part can be of external origin but preferably comprises a portion of the gas dried in the contacting zone. The stripping zone is operated at a temperature of from about 200° F. to about 450° F. and a pressure which is higher than, equal to or lower than the pressure of the regeneration zone. Preferred are relatively lower pressures of from about 0 psia to about 20 psia achieved with the aid of vacuum means such as a vacuum pump, located downstream from the stripping zone. It is very beneficial to employ relatively low stripping pressures in order to promote stripping efficiency and glycol purity and the separation of the stripping zone from the regeneration zone permits the preferred use of a pressure in the stripping zone lower than could be used in the regeneration zone without undue glycol loss. The gaseous overhead from the stripping zone is returned to the regeneration zone and ultimately the separation zone for separation and recovery of normally liquid components and recirculation of the normally gaseous components to the contacting zone. The bottoms product of the stripper comprises glycol of reduced water content which is returned to the contacting zone for use with additional gaseous feed.

The process of the invention is therefore adaptable to producing regenerated glycol with a low water content as partially determined by the presence of or the absence of the indicated stripping zone. Physical separation of the stripping zone and the regeneration zone particularly enables efficiency of water removal through the possibility of using differing conditions of temperature and pressure. In neither modification, however, are there hydrocarbon emissions to the environment.

It should be appreciated that the above description is general in form and does not include various items such as pumps and heat exchangers which may facilitate but do not fundamentally effect operation of the present invention. Use and operation of such items is within the skill and knowledge of the art.

DETAILED DESCRIPTION OF THE DRAWINGS

In FIG. 1, a natural gas stream is introduced by line 1 to a lower portion of Contactor A, depicted as a multi-tray vertical column, operating at a temperature of about 80° F. to about 120° F. and a pressure of about 100 psia to about 1200 psia. In Contactor A, the rising gas counter-currently contacts descending water-lean triethylene glycol. The dried gas leaves Contactor A as overhead product and, after exchanging with somewhat warmer lean glycol in Heat Exchanger B, is withdrawn by line 3 from the process for transmission, storage or sale. Water-rich glycol leaves Contactor A as bottoms product and is passed by line 9 through Reflux Coils C to Flash Tank E (optional but present in this embodiment) wherein at least a portion of the normally gaseous components of the rich glycol are removed by flashing at about 80° F. to about 150° F. and a pressure of about 30 psia to about 150 psia as overhead by line 11. The remaining components of the rich glycol passes by line 13 through Heat Exchanger F where heat exchange occurs with warmer lean glycol takes place. The rich glycol at about 300° F., then enters an upper portion of Glycol Regenerator G, which is shown as a packed column. Regenerator G operates at a temperature of about 200° F. to about 400° F. and a pressure of from about 14 psia to about 17 psia. The rich glycol descends through Regenerator G as it is contacted with hot vapors rising from Reboiler H located at the lower end of Regenerator G. Reboiler H operates at a temperature of about 300° F. to about 400° F. and a pressure of about 14 psia to 17 psia. The reflux for Regenerator G is provided by Reflux Coils C which, although depicted as being separately located, are typically located at the top of Regenerator G. The vapors leaving regenerator G as overhead by line 15 are partially condensed in Condenser I(80°–175° F. and at or near atmospheric pressure) and enter Separator J which operates at or about atmospheric pressure and a temperature of from about 80° F. to about 175° F. Hydrocarbon liquids, principally the higher-boiling aromatic components of the natural gas feed, pass from Separator J by line 22 to storage (not shown) for future sale or separation. Aqueous liquid leaves Separator J by line 23 to typical waste water disposal means (not shown).

Water-lean glycol of about 98.6% by weight purity leaves Reboiler H as bottoms produced by line 17 at about 400° F. This lean glycol then exchanges with cooler rich glycol in Heat Exchanger F and is pumped with the aid of Pump D through Heat Exchanger B for reintroduction into Contactor A.

The normally gaseous component separated in Separator J is passed by line 19 and combined with overhead vapor from Flash Tank E. The combined vapors in line 21 are compressed by Compressor K to a pressure high enough to allow mixing with feed natural gas for introduction into Contactor A.

In FIG. 2, a particularly preferred embodiment of the invention is depicted in a process scheme similar to that of FIG. 1 but which includes a stripping column, a gas heater and a vacuum pump. A natural gas stream is introduced by line 1 to a lower portion of Contactor A, depicted as a multi-tray vertical column, which operates at a temperature of about 80° to about 120° F. and a pressure of about 100 psia to about 1200 psia. In Contactor A, the rising gas contacts descending water-lean triethylene glycol. The dried gas leaves Contactor A as overhead by line 3 and is subsequently split into two portions. The major portion of the gas passes by line 203 and, after that exchange with warmer lean glycol in Heat Exchanger B, leaves the system for transmission, storage or sale. The minor portion of the gaseous overhead from Contactor A passes by line 204 and, after heating in gas heater L, is passed to stripper M, the operation of which is described below. Water-rich triethylene glycol is removed from Contactor A as bottoms product and is passed by line 9 through Reflux Coils C, operating at 80° F. to 150° F. and a pressure of 30 psia to 150 psia to Flash Tank E (optional but present in this preferred embodiment) which operates at about 80° F. to 150° F. and a pressure of about 30 psia to 150 psia. In Flash Tank E, a portion of the normally gaseous components of the rich glycol are removed overhead by line 11. The remaining components of the rich glycol pass by line 13 through Heat Exchanger F, where heat exchange with warmer lean glycol takes place, and then enters an upper portion of Regenerator G at about 300° F. and a pressure of about 14 psia to 17 psia. Regenerator G, typically a packed vertical column, is operated at a temperature of about 200° F. to 400° F. and a pressure of about 14 psia to about 17 psia. The rich glycol descends through contactor G as it encounters hot (300°–400° F.) vapors rising from Reboiler H located at the lower portion of Contactor G. Reboiler H operates at about 300° F. to 400° F. and a pressure of about 14 psia to 17 psia. The vapor leaving Regenerator G overhead is passed by line 15 through Condenser I (80° F. to 175° F. and a pressure near atmospheric pressure) and into Separator J operating at or about atmospheric pressure and a temperature of from about 80° F. to about 175° F. Hydrocarbon liquids, principally the higher-boiling aromatic components of the natural gas feed, leave Separator J by line 22 and are subsequently sent to storage (not shown) for sale or further separation. Aqueous liquid passes from Separator J by line 23 to conventional waste water disposal means (not shown). Initial water-lean glycol of about 98.6% by weight glycol leaves Reboiler H as bottoms product at about 400° F. and is passed by line 222 to an upper portion of stripper M. Also entering Stripper M (by line 204) at a lower portion is the minor portion of dried gas from Contactor A, after being warmed to 300° F. to 400° F. in heater L. The Stripper M operates at a temperature of about 300° F. to 400° F. and under a lowered pressure of about 5 psia, obtained with the aid of vacuum pump N. The dried gas contacts the initial lean glycol counter-currently during passage through stripper M, thereby producing a bottoms product a second lean glycol of at last 99.99% by weight glycol and an aqueous gas mixture which exits Stripper M as overhead and returns by line 223 to Reboiler H.

The second and leaner glycol passes by line 217 through Heat Exchanger F where heat exchange with cooler rich glycol occurs. The leaner glycol is then pumped with the aid of Pump D through Heat Exchanger B where heat exchange occurs with dried gas and the leaner glycol is then reintroduced into Contactor A.

The gaseous product of Separator J is transferred by line 19 and combined with the overhead from Flash Tank E passing by line 11. The combined gas is compressed by Compressor K to a pressure high enough to facilitate reintroduction into Contactor A together with the feed gas.

The above description of the invention is for illustrative purposes and various changes in the size, shape and materials as well as in the details of the illustrated process may be made within the scope of the appended claims.

What is claimed is:

1. In the process of dehydrating a natural gas stream comprising predominately methane by contact with diethylene glycol in a contacting zone to produce a dried natural gas stream as contacting zone overhead product and a water-rich glycol as contacting zone bottoms product, withdrawing a major portion of the dried natural gas contacting zone overhead product from the process and heating the water-rich glycol at a temperature below the glycol decomposition temperature in a regeneration zone and returning the resulting water-lean glycol to the contacting zone, the improvement of:

partially condensing the gaseous, water-containing overhead product of the regeneration zone and returning the gaseous portion of the partial condensate to a lower portion of the contacting zone; and stripping the water-lean bottoms product of the regeneration zone with the remaining dried natural gas contacting zone overhead product in a stripping zone under reduced or equal pressure, passing the gaseous overhead product of the stripping zone to the regeneration zone and returning the glycol-containing bottoms product of reduced water content to the contacting zone.

2. In the process of dehydrating a natural gas stream comprising predominately methane by contact with triethylene glycol in a contacting zone to produce a dried natural gas stream as contacting zone overhead product and a water-rich glycol as contacting zone bottoms product, withdrawing a major portion of the dried natural gas contacting zone overhead product from the process and heating the water-rich glycol at a temperature below the glycol decomposition temperature in a regeneration zone and returning the resulting water-lean glycol to the contacting zone, the improvement of:

partially condensing the gaseous, water-containing overhead product of the regeneration zone and returning the gaseous portion of the partial condensate to a lower portion of the contacting zone; and stripping the water-lean bottoms product of the regeneration zone with the remaining dried natural gas contacting zone overhead product in a stripping zone under reduced or equal pressure, passing the gaseous overhead product of the stripping zone to the regeneration zone and returning the glycol-containing bottoms product of reduced water content to the contacting zone.

3. The process of claim 2 wherein the partial condensation of the gaseous, water-containing overhead product of the regeneration zone is at a temperature of from 80° F. to 175° F. and a pressure near atmospheric pressure.

4. The process of claim 2 wherein the stripping zone operates at a temperature of about 300° F. to about 400° F.

5. The process of claim 4 wherein the stripping zone operates at a pressure of about 5 psia.

* * * * *